(12) United States Patent
Zeng

(10) Patent No.: US 9,916,676 B2
(45) Date of Patent: Mar. 13, 2018

(54) 3D MODEL RENDERING METHOD AND APPARATUS AND TERMINAL DEVICE

(71) Applicant: TENCENT TECHNOLOGY (SHENZHEN) COMPANY LIMITED, Shenzhen (CN)

(72) Inventor: Zongwang Zeng, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 15/316,848

(22) PCT Filed: Jun. 10, 2015

(86) PCT No.: PCT/CN2015/081158
§ 371 (c)(1),
(2) Date: Dec. 7, 2016

(87) PCT Pub. No.: WO2015/188749
PCT Pub. Date: Dec. 17, 2015

(65) Prior Publication Data
US 2017/0116771 A1    Apr. 27, 2017

(30) Foreign Application Priority Data
Jun. 10, 2014   (CN) .......................... 2014 1 0255533

(51) Int. Cl.
G06T 15/50    (2011.01)
G06T 15/04    (2011.01)
(Continued)

(52) U.S. Cl.
CPC ............ *G06T 15/005* (2013.01); *G06T 15/04* (2013.01); *G06T 15/506* (2013.01); *G06T 19/20* (2013.01);
(Continued)

(58) Field of Classification Search
None
See application file for complete search history.

(56) References Cited

U.S. PATENT DOCUMENTS 6,130,671 A     10/2000  Argiro
6,988,059 B1 *  1/2006   Hasegawa ............... G06T 15/10
                                                            345/419
(Continued)

FOREIGN PATENT DOCUMENTS

CN    101984467 A    3/2011
CN    103337093 A    10/2013
CN    103631762 A    3/2014

OTHER PUBLICATIONS

International Search Report and Written Opinion, International Application No. PCT/CN2015/081158, dated Sep. 9, 2015.
Office Action in CN Application No. 201410255533.4 dated Jun. 13, 2016, 7 pages, with a concise statement of relevance.

*Primary Examiner* — Andrew G Yang
(74) *Attorney, Agent, or Firm* — Marshall, Gerstein & Borun LLP

(57) ABSTRACT

The present application discloses a 3D model rendering method and apparatus and a terminal device. The method includes calculating, in a diffuse reflection illumination situation simulated by hardware, dot product operation results of a light vector and a normal line vector of each vertex on a surface of a 3D model, converting the dot product operation results of each vertex to corresponding UV coordinate values, then drawing, according to a preset correspondence between UV coordinate values and a color value of a 3D model basic texture after receiving light, a gradient map having a color value corresponding to the UV coordinate values of the each vertex, and covering the surface of the 3D model with the gradient map. The rendering method according to the present application transfers a conventional process of coloration in a three-dimensional (Continued)

model to drawing a gradient map in a two-dimensional plane and then, further covering the 3D model with the drawn gradient map, has a simpler processing process, and also reduces a performance requirement on an electronic device in a process of performing 3D model rendering.

8 Claims, 8 Drawing Sheets

(51) Int. Cl.
  *G06T 15/80* (2011.01)
  *G06T 15/00* (2011.01)
  *G06T 19/20* (2011.01)
(52) U.S. Cl.
  CPC ............... *G06T 2219/2012* (2013.01); *G06T 2219/2016* (2013.01)

(56) References Cited

U.S. PATENT DOCUMENTS

| | | | |
|---|---|---|---|
| 7,274,372 B1 | 9/2007 | Lake et al. | |
| 2002/0158881 A1* | 10/2002 | vanWelzen | G06T 15/005 345/582 |
| 2003/0100366 A1* | 5/2003 | Nagase | A63F 13/00 463/33 |
| 2005/0068329 A1* | 3/2005 | Hanau | G06T 15/04 345/589 |
| 2005/0195209 A1 | 9/2005 | Lake et al. | |
| 2010/0194768 A1 | 8/2010 | Schrag | |
| 2014/0028678 A1* | 1/2014 | Chmielewski | G06T 5/002 345/426 |
| 2015/0097829 A1* | 4/2015 | Algreatly | G06T 13/20 345/420 |

* cited by examiner

3D MODEL RENDERING METHOD AND APPARATUS AND TERMINAL DEVICE

FIELD OF THE TECHNOLOGY

The present application relates to the field of rendering processing, and more specifically, to a 3D model rendering method and apparatus and a terminal device.

BACKGROUND OF THE DISCLOSURE

A 3D model is also referred to as a three-dimensional model or a stereoscopic model and includes models of various buildings, characters, vegetation, machinery, and the like. A 3D model can be interacted and presented stereoscopically in a web page to produce a stronger visual effect for a viewer.

Coloration of a 3D model is performing shade processing on the 3D model, so as to generate a vivid image, and rendering is based on the coloration and shows bright and dark colors and an illumination effect on a surface of the 3D model, so as to form a more vivid image. An effect of an image obtained by means of rendering is of more reality sense and material sense. At present, when rendering is performed on a 3D model, a Blinn-Phong illumination model is usually used, and this illumination model is based on a conventional Phong illumination model and a modification, and as compared with the conventional Phong illumination model, has a softer and smoother rendering effect.

The inventor of the present application finds by means of researches that: an existing 3D model rendering manner by using a Blinn-Phong illumination model is mainly calculating coloration of each vertex on a surface of a 3D model, so as to color each vertex on the 3D model. However, coloring each point on the 3D model would cause a very huge calculation amount and has a very high requirement on performance of an electronic device in a process of performing 3D model rendering.

SUMMARY

In view of the above, the present application provides a 3D model rendering method and apparatus and a terminal device, so as to solve problems of complex coloration operations and a high requirement on performance of an electronic device in a process of performing a 3D model rendering that exist in an existing 3D model rendering manner.

In order to achieve the foregoing purpose, a solution is proposed now as follows:

A 3D model rendering method, including:
calculating, in a diffuse reflection illumination situation simulated by hardware, dot product operation results of a light vector and a normal line vector of each vertex on a surface of a 3D model, the light vector corresponding to the diffuse reflection illumination, and converting the dot product operation results of each vertex to corresponding UV coordinate values;
drawing, according to a preset correspondence between UV coordinate values and a color value of a 3D model basic texture after receiving light, a gradient map having a color value corresponding to the UV coordinate values of the each vertex; and
covering the surface of the 3D model with the gradient map.

A 3D model rendering apparatus, including:
a first calculation unit, configured to calculate, in a diffuse reflection illumination situation simulated by hardware, dot product operation results of a light vector and a normal line vector of each vertex on a surface of a 3D model, the light vector corresponding to the diffuse reflection illumination;
a conversion unit, configured to convert the dot product operation results of each vertex to corresponding UV coordinate values;
a gradient map drawing unit, configured to draw, according to a preset correspondence between UV coordinate values and a color value of a 3D model basic texture after receiving light, a gradient map having a color value corresponding to the UV coordinate values of the each vertex; and
a gradient map covering unit, configured to cover the surface of the 3D model with the gradient map.

A terminal device, including 3D model rendering apparatus.

In view of the foregoing technical solution, it could be known that the 3D model rendering method disclosed by embodiments of the present application includes calculating, in a diffuse reflection illumination situation simulated by hardware, dot product operation results of a light vector and a normal line vector of each vertex on a surface of a 3D model, converting the dot product operation results of each vertex to corresponding UV coordinate values, then drawing, according to a preset correspondence between UV coordinate values and a color value of a 3D model basic texture after receiving light, a gradient map having a color value corresponding to the UV coordinate values of the each vertex, and covering the surface of the 3D model with the gradient map, so as to complete rendering on the 3D model. The rendering method provided by the present application uses dot product operation results of a light vector and a normal line vector of each vertex on the surface of the 3D model to draw a gradient map instead of performing vertex coloration in a conventional solution, transfers a conventional process of coloration in a three-dimensional model to drawing a gradient map in a two-dimensional plane and then, further covering the 3D model with the drawn gradient map, so as to achieve the same effect, and as compared with the existing technology, has a simpler processing process and also reduces a performance requirement on an electronic device in a process of performing 3D model rendering.

BRIEF DESCRIPTION OF THE DRAWINGS

To describe the technical solutions of the embodiments of the present application or the existing technology more clearly, the following briefly introduces the accompanying drawings required for describing the embodiments or the existing technology. Apparently, the accompanying drawings in the following description show only some embodiments of the present application, and persons of ordinary skill in the art may still derive other drawings from these accompanying drawings without creative efforts.

DESCRIPTION OF EMBODIMENTS

In order to make objectives, technical solutions, and advantages of embodiments of the present application more clear, the technical solutions in the embodiments of the present application will be clearly and completely described in the following with reference to the accompanying drawings. It is obvious that the embodiments to be described are only a part rather than all of the embodiments of the present application. All other embodiments obtained by persons skilled in the art based on the embodiments of the present application without creative efforts shall fall within the protection scope of the present application.

Figure 1:
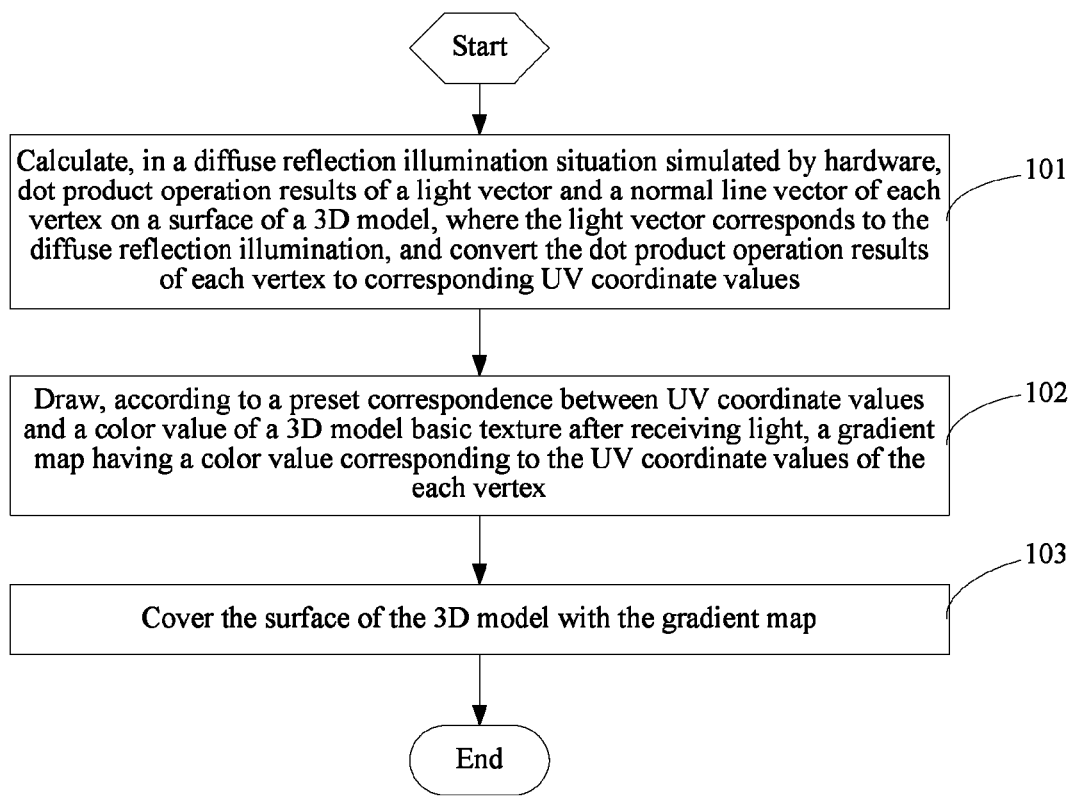
FIG. 1 is a flowchart of a 3D model rendering method disclosed by an embodiment of the present application.

The 3D model rendering technology has been widely applied to various fields, and some relatively mature ones are, for example, THE IDOLM@STER and Dream C Club that use the cartoon rendering technology. However, operations of an existing 3D model rendering process are complex, and during a process of performing 3D model rendering, a terminal device would usually encounter a problem of poor smoothness. Hence, an embodiment of the present application provides a 3D model rendering method. Referring to FIG. 1, FIG. 1 is a flowchart of a 3D model rendering method disclosed by an embodiment of the present application.

As shown in FIG. 1, the rendering method includes:

Step 101: Calculate, in a diffuse reflection illumination situation simulated by hardware, dot product operation results of a light vector and a normal line vector of each vertex on a surface of a 3D model, where the light vector corresponds to the diffuse reflection illumination, and convert the dot product operation results of each vertex to corresponding UV coordinate values.

Specifically, hardware is used to simulate diffuse reflection ambient light, that is, simulating an illumination direction and illumination intensity. Under illumination of the diffuse reflection ambient light, a color of an object per se is shown. Under the illumination of the diffuse reflection ambient light, a conventional rendering method uses a Blinn-Phong illumination, that is, determining coloration of each vertex on a surface of a 3D model by means of dot product operation results of a light vector and a normal line vector.

In order to facilitate understanding of a reader, a concept of UV coordinates is introduced. Every image file is a two-dimensional plane. A horizontal direction is U, a vertical direction is V, and any pixel in an image can be positioned by mean of this planar, two-dimensional UV coordinate system. When a two-dimensional plane is adhered to a surface of a three-dimensional model, because the three-dimensional model per se has a UV parameter, although this UV value is a parameter used for positioning a point on the surface, because it is also two-dimensional, it would be easy to make a point on the surface of the three-dimensional model correspond to a pixel on the plane by means of conversion. With regard to a texture map, numerical ranges of U and V coordinates of one map are both from 0 to 1, and no matter what an actual resolution is, software would automatically convert UV texture coordinates to pixel coordinates of the map.

Because a range of dot product operation values of a light vector and a normal line vector of each vertex is consistent with a range of a trigonometric cosine, the dot product operation values can be processed in such a way that a result value of a dot product operation result less than 0 is set to 0, and a value greater than 0 is not processed, so as to define that a value range of the dot product operation values is (0,1). This value is just identical to a value range of the UV coordinates (0,1) of a 3D model vertex. Then, each of the dot product operation results is converted, according to a preset correspondence between dot product operation results and UV coordinate values, to a UV coordinate value of the vertex.

Step 102: Draw, according to a preset correspondence between UV coordinate values and a color value of a 3D model basic texture after receiving light, a gradient map having a color value corresponding to the UV coordinate values of the each vertex.

Specifically, after receiving light, the 3D model has different bright and dark color effects at positions of different UV coordinate values. A correspondence between the UV coordinate value and a color value of a 3D model basic texture after receiving light is preset. According to characteristics of the illumination model, it could be known that when the UV coordinate is 0, it corresponds to a darkest illuminated area, and when the UV coordinate is 1, it corresponds to a brightest illuminated area. According to this characteristic, colors of bright and dark areas are drawn on one gradient map, so as to implement a customized light and shade drawing effect.

Step 103: Cover the surface of the 3D model with the gradient map.

Specifically, covering the surface of the 3D model with the gradient map may be considered to be another 3D model rendering manner, and by means of this step, rendering on the 3D model under diffuse reflection illumination is implemented.

The 3D model rendering method disclosed by embodiments of the present application includes calculating, in a diffuse reflection illumination situation simulated by hardware, dot product operation results of a light vector and a normal line vector of each vertex on a surface of a 3D model, converting the dot product operation results of each vertex to corresponding UV coordinate values, then drawing, according to a preset correspondence between UV coordinate values and a color value of a 3D model basic texture after receiving light, a gradient map having a color value corresponding to the UV coordinate values of the each vertex, and covering the surface of the 3D model with the gradient map, so as to complete rendering on the 3D model. The rendering method provided by the present application uses dot product operation results of a light vector and a normal line vector of each vertex on the surface of the 3D model to draw a gradient map instead of performing vertex coloration in a conventional solution, transfers a conventional process of coloration in a three-dimensional model to drawing a gradient map in a two-dimensional plane and then, further covering the 3D model with the drawn gradient map, so as to achieve the same effect, and as compared with the existing technology, has a simpler processing process and also reduces a performance requirement on an electronic device in a process of performing 3D model rendering.

The 3D model rendering method disclosed by the foregoing embodiment of the present application can be applied to a processing process of an electronic device, and the electronic device may be a computer or a mobile terminal device. With the development of handheld terminals in recent years, more and more applications can all be implemented on a handheld terminal. Moreover, cartoon games using the 3D model rendering technology, such as THE IDOLM@STER, has a very high requirement on performance of a handheld terminal. Because a conventional 3D model rendering manner has a complex algorithm, it would be difficult to ensure smoothness of a game when it runs on a handheld terminal, while using the rendering method provided by the present application can greatly reduce complexity of the rendering technology, thereby improving smoothness of running a game on the handheld terminal.

Figure 2:
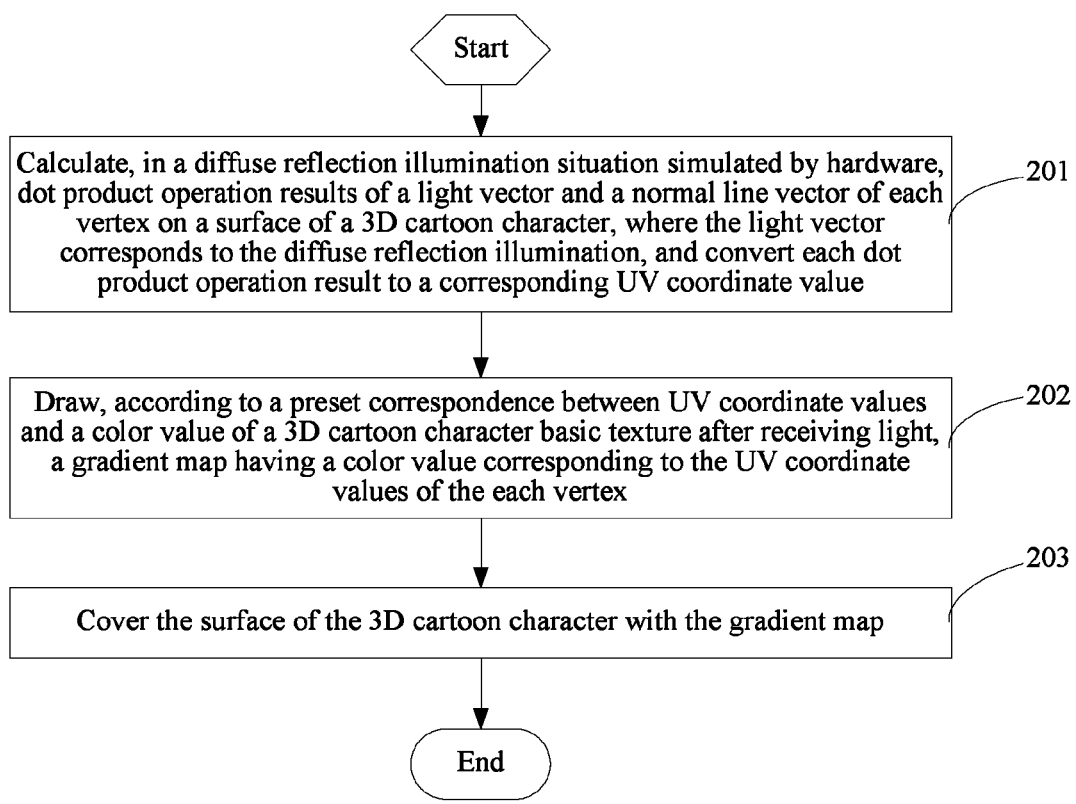
FIG. 2 is a flowchart of a 3D cartoon character rendering method disclosed by an embodiment of the present application.

Optionally, the 3D model rendering method disclosed by the embodiment of the present application may be applied to cartoon games, which are popular currently, to complete rendering on 3D cartoon characters. Referring to FIG. 2, FIG. 2 is a flowchart of a 3D cartoon character rendering method disclosed by an embodiment of the present application.

As shown in FIG. 2, a process of performing rendering on a 3D cartoon character includes:

Step 201: Calculate, in a diffuse reflection illumination situation simulated by hardware, dot product operation results of a light vector and a normal line vector of each vertex on a surface of a 3D cartoon character, where the light vector corresponds to the diffuse reflection illumination, and convert each dot product operation result to a corresponding UV coordinate value.

Step 202: Draw, according to a preset correspondence between UV coordinate values and a color value of a 3D cartoon character basic texture after receiving light, a gradient map having a color value corresponding to the UV coordinate values of the each vertex.

Step 203: Cover the surface of the 3D cartoon character with the gradient map.

For a specific implementation manner of each foregoing step, reference may be made to introduction to the previous embodiment.

Figure 3:
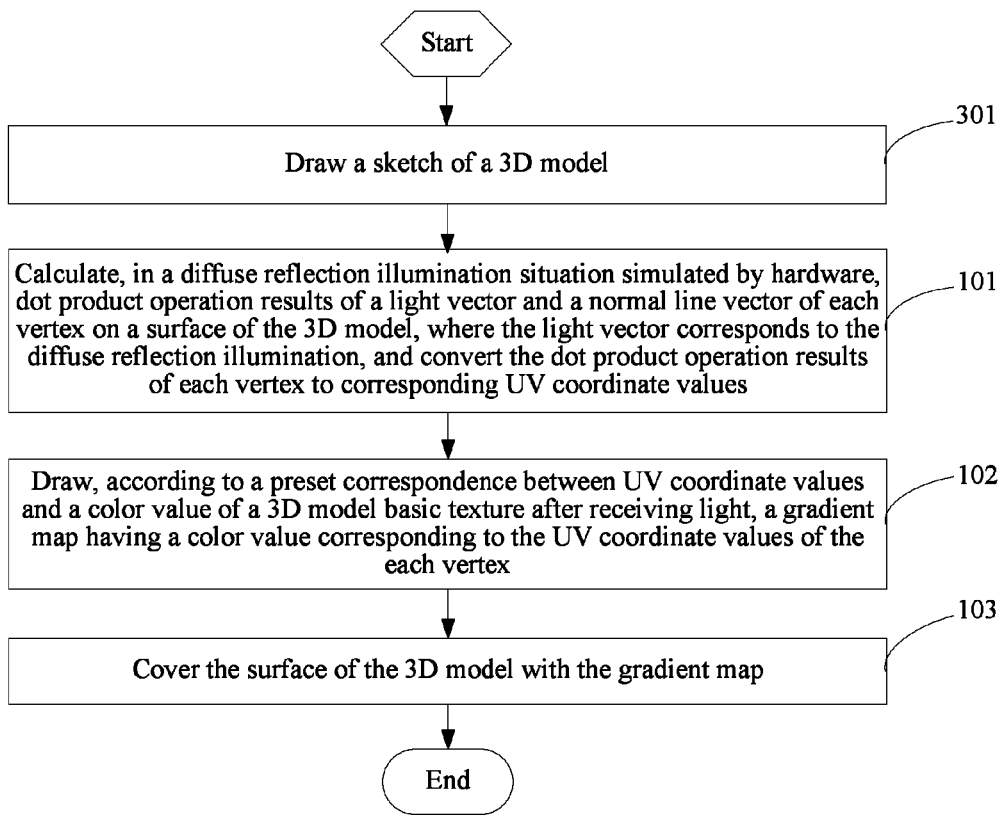
FIG. 3 is a flowchart of another 3D model rendering method disclosed by an embodiment of the present application.

Referring to FIG. 3, FIG. 3 is a flowchart of another 3D model rendering method disclosed by an embodiment of the present application.

On the basis of FIG. 1 of the foregoing embodiment, this embodiment is further added with step 301: Draw a sketch of a 3D model.

A process of a drawing a model sketch may be before calculating dot product operation results of a light vector and a normal line vector of each vertex on a surface of a 3D model and certainly may be after step 103: Cover the surface of the 3D model with the gradient map. These are two independent drawing processes.

Figure 4:
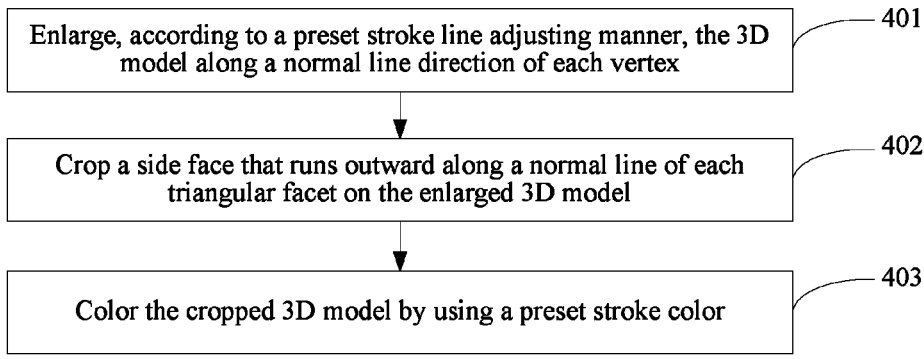
FIG. 4 is a flowchart of a method for drawing a sketch of a 3D model disclosed by an embodiment of the present application.

Optically, FIG. 4 shows an optical manner of a method for drawing a sketch of a 3D model disclosed by an embodiment of the present application, as shown FIG. 4:

Step 401: Enlarge, according to a preset stroke line adjusting manner, the 3D model along a normal line direction of each vertex.

During a process of enlarging the model, each vertex of the 3D model deviates from the normal line direction of the each vertex by a distance of a preset value, so as to complete the process of enlarging the model. When the model is enlarged, the enlargement is performed according to a preset stroke line adjusting manner. The stroke line adjusting manner may be adjusting, according to a correspondence between a distance between the 3D model and a camera and a thickness of the stroke line, the thickness of the stroke line. The correspondence between the distance and the thickness can be considered to be set. In addition to this adjusting manner, the thickness value of the stroke line may be set to a set value, that is, the thickness of the stroke line does not vary with the variation of the distance between the 3D model and the camera.

Step 402: Crop a side face that runs outward along a normal line of each triangular facet on the enlarged 3D model.

Specifically, the cropping includes front-side cropping and back-side cropping. Herein, a front-side cropping manner is used in step 402, and the so-called front-side cropping is not performing rendering on a side face that runs outward along a normal line of each triangular facet on a 3D model and only performing rendering on an inward side face. On the contrary, the back-side cropping is performing rendering on a side face that runs outward along a normal line of each triangular facet on a 3D model and not performing rendering on an inward side face.

Commonly speaking, cropping is determining whether rendering is performed on a front side or a back side of a facet.

Step 403: Color the cropped 3D model by using a preset stroke color.

One stroke color is uniformly set for the foregoing cropped 3D model. The effect of rendering in this process would be used as an outline. Therefore, the color of the rendering herein may also be referred to as a stroke color. In this process, the color used for the rendering can be set.

Figure 5:
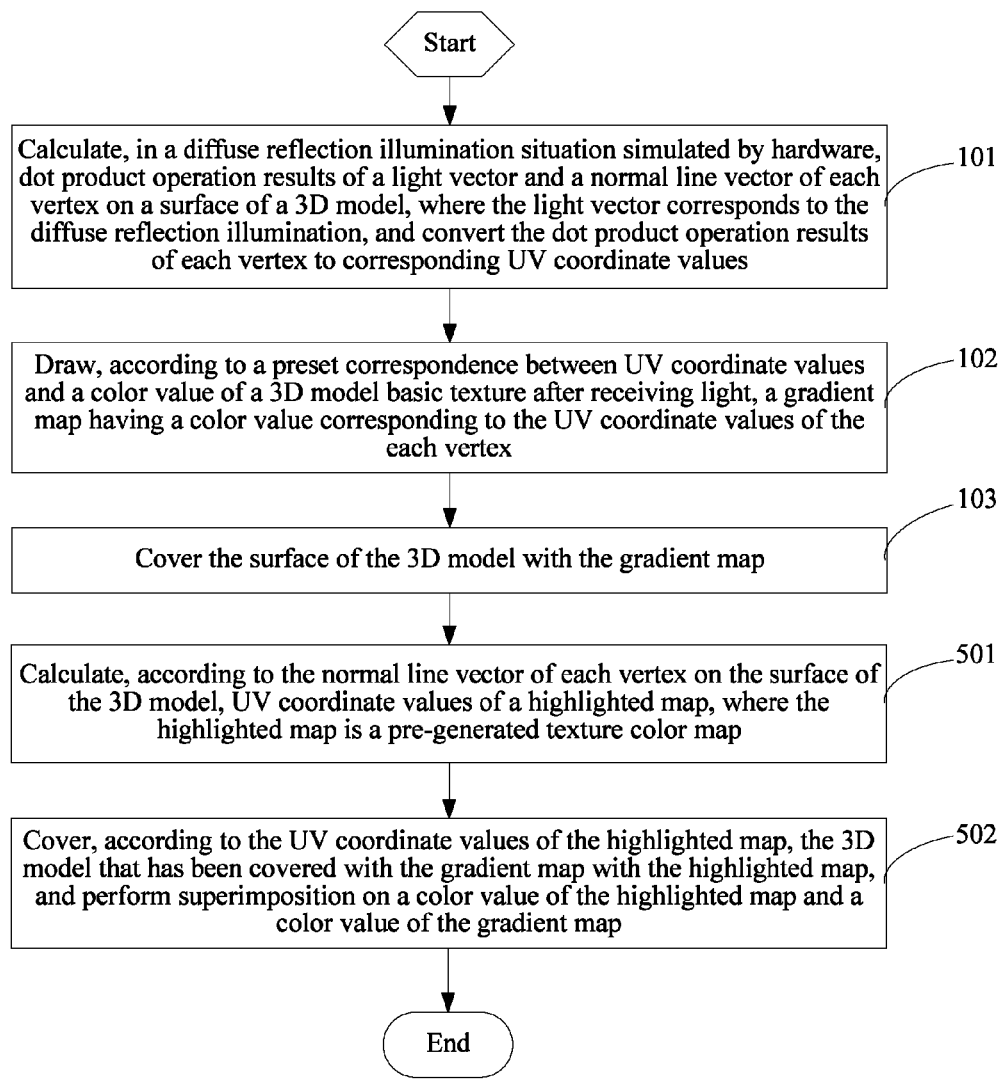
FIG. 5 is a flowchart of still another 3D model rendering method disclosed by an embodiment of the present application.

On the basis of the foregoing embodiment, the 3D model rendering method disclosed by the present application may further include the following steps. Referring to FIG. 5, FIG. 5 is a flowchart of still another 3D model rendering method disclosed by an embodiment of the present application.

As shown in FIG. 5, as compared with FIG. 1, the following two steps are added:

Step 501: Calculate, according to the normal line vector of each vertex on the surface of the 3D model, UV coordinate values of a highlighted map, where the highlighted map is a pre-generated texture color map.

Step 502: Cover, according to the UV coordinate values of the highlighted map, the 3D model that has been covered with the gradient map with the highlighted map, and perform superimposition on a color value of the highlighted map and a color value of the gradient map.

Certainly, FIG. 5 merely illustrates expanding the solution on the basis of FIG. 1, and it can also expand the solution on the basis of FIG. 3, that is, also including a process of drawing a sketch of a 3D model at the same time.

The foregoing process is carried out in a highlight environment simulated by hardware, and highlight indicates a generated intent highlighted area, namely, a highlighted point, of an object as being irradiated by a light ray. This phenomenon is that a light ray generates specular reflection from an area that receives light vertically, and according to different smoothness degrees of objects, sizes and shapes of the generated highlighted points are all different.

According to the variation of the highlighted map, various highlights can be simulated, for example, an annular highlight on an edge of an object and an angel-ring highlight of hair, and can be used for simulating fake reflection. Therefore, a properly drawn highlighted map can produce abundant effects.

The 3D model is covered with a previously-drawn highlighted map according to the calculated UV coordinate value, and then superimposition is performed on a color value of the highlighted map and a color value of the gradient map, so as to complete a rendering process of the 3D model under diffuse reflection illumination and highlight situations, thereby obtaining a 3D model having divided bright and dark areas.

During the rendering under the highlight situation, the conventional highlight algorithm is not used, and a defect of a large operation amount of the conventional highlight algorithm is also avoided. The UV coordinates of the highlighted map are calculated by using the spherical mapping UV, then the 3D model is covered with the highlighted map correspondingly, and superimposition of a highlighted map color and a gradient map color is completed. In the whole process, the processing manner is simpler.

Figure 6:
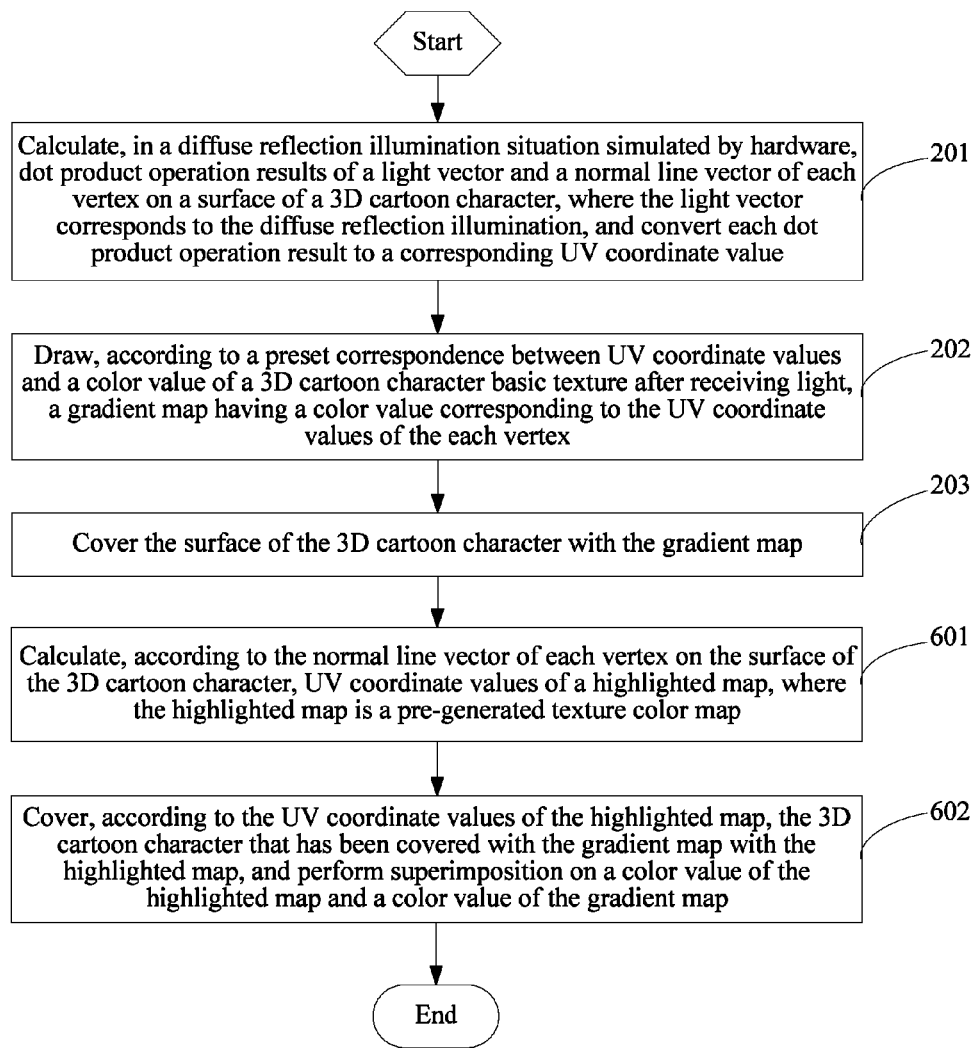
FIG. 6 is a flowchart of another 3D cartoon character rendering method disclosed by an embodiment of the present application.

If a 3D cartoon character is still used as an example, as compared with the 3D cartoon character rendering process in FIG. 2, the 3D cartoon character rendering process may be further added with the following steps. Referring to FIG. 6, FIG. 6 is a flowchart of another 3D cartoon character rendering method disclosed by an embodiment of the present application.

As shown in FIG. 6, the added steps include:

Step 601: Calculate, according to the normal line vector of each vertex on the surface of the 3D cartoon character, UV coordinate values of a highlighted map, where the highlighted map is a pre-generated texture color map.

Step 602: Cover, according to the UV coordinate values of the highlighted map, the 3D cartoon character that has been covered with the gradient map with the highlighted map, and perform superimposition on a color value of the highlighted map and a color value of the gradient map.

A 3D model rendering apparatus according to an embodiment of the present invention is described below, and cross-reference may be made between the 3D model rendering apparatus described below and the foregoing 3D model rendering method accordingly.

Figure 7:
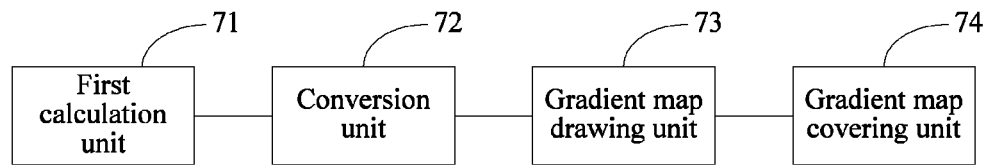
FIG. 7 is a structural block diagram of a 3D model rendering apparatus disclosed by an embodiment of the present application.

FIG. 7 is a structural block diagram of a 3D model rendering apparatus disclosed by an embodiment of the present application. The rendering apparatus may be applied to a terminal device capable of performing 3D model rendering. Referring to FIG. 7, the apparatus may include:

a first calculation unit 71, configured to calculate, in a diffuse reflection illumination situation simulated by hardware, dot product operation results of a light vector and a normal line vector of each vertex on a surface of a 3D model, the light vector corresponding to the diffuse reflection illumination;

a conversion unit 72, configured to convert the dot product operation results of each vertex to corresponding UV coordinate values;

a gradient map drawing unit 73, configured to draw, according to a preset correspondence between UV coordinate values and a color value of a 3D model basic texture after receiving light, a gradient map having a color value corresponding to the UV coordinate values of the each vertex; and a gradient map covering unit 74, configured to cover the surface of the 3D model with the gradient map.

Figure 8:
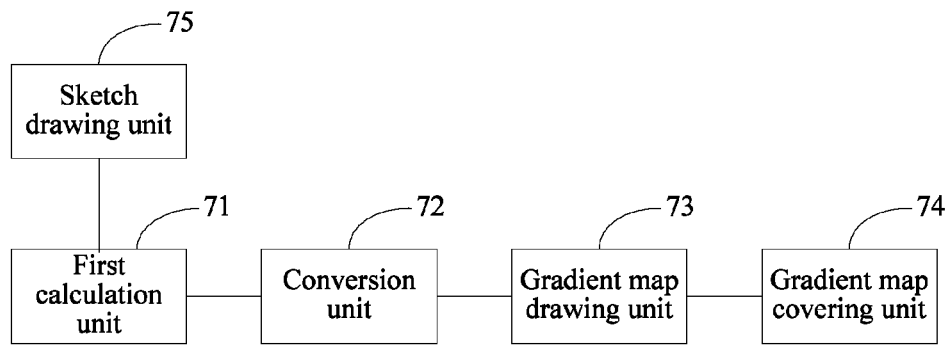
FIG. 8 is a structural block diagram of another 3D model rendering apparatus disclosed by an embodiment of the present application.

Optionally, FIG. 8 shows another optional structure of the 3D model rendering apparatus according to an embodiment of the present application. Referring to FIG. 7 and FIG. 8, the rendering apparatus may further include:

a sketch drawing unit 75, configured to draw, before the first calculation unit 71 calculates dot product operation results of a light vector and a normal line vector of each vertex on a surface of a 3D model, a sketch of the 3D model.

Figure 9:
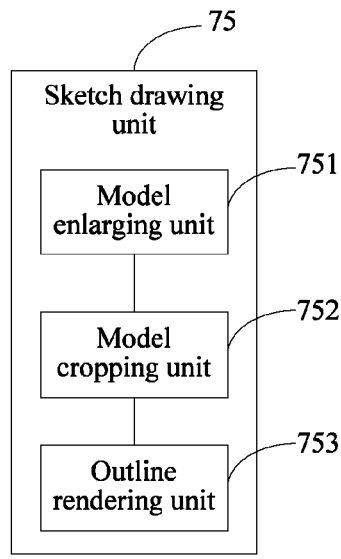
FIG. 9 is a structural block diagram of a sketch drawing unit disclosed by an embodiment of the present application.

Optionally, FIG. 9 shows an optional structure of the sketch drawing unit 75 according to an embodiment of the present application. Referring to FIG. 9, the sketch drawing unit 75 may include:

a model enlarging unit 751, configured to enlarge, according to a preset stroke line adjusting manner, the 3D model along a normal line direction of each vertex;

a model cropping unit 752, configured to crop a side face of a side that runs outward along a normal line of each triangular facet on the enlarged 3D model; and an outline rendering unit 753, configured to color the cropped 3D model by using a preset stroke color.

The preset stroke line adjusting manner may be adjusting, according to a correspondence between a distance between the 3D model and a camera and a thickness of the stroke line, the thickness of the stroke line; or, setting the thickness of the stroke line to a fixed value.

Figure 10:
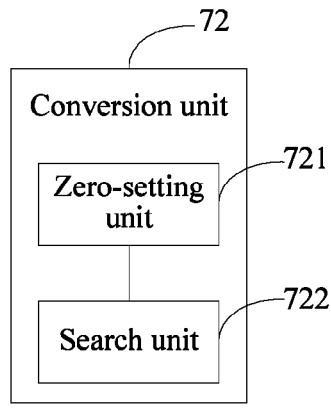
FIG. 10 is a structural block diagram of a conversion unit disclosed by an embodiment of the present application.

Optionally, FIG. 10 shows an optional structure of the conversion unit 72 according to an embodiment of the present application. Referring to FIG. 10, the conversion unit 72 may include:

a zero-setting unit 721, configured to set a result value of the dot product operation result that is less than 0 to 0 and control a value range of the dot product operation result to fall within a range of 0 to 1; and a searching unit 722, configured to search for a preset correspondence between the dot product operation results and the UV coordinate values and convert each of the dot product operation results to the UV coordinate value of the vertex.

A value range of the UV coordinate values is from 0 to 1.

Figure 11:
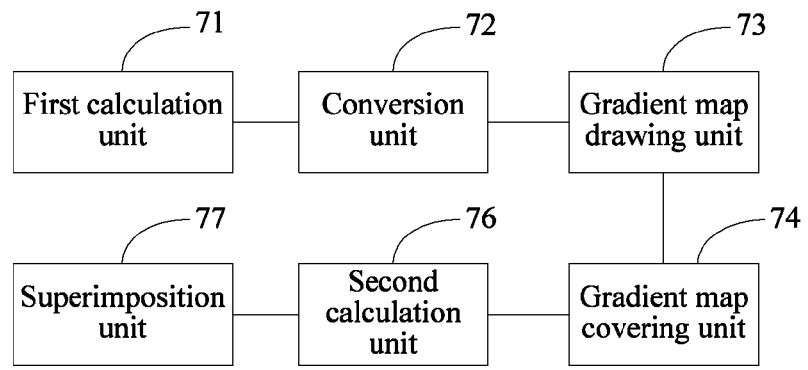
FIG. 11 is a structural block diagram of still another 3D model rendering apparatus disclosed by an embodiment of the present application.

Optionally, FIG. 11 shows still another optional structure of the 3D model rendering apparatus according to an embodiment of the present application. Referring to FIG. 7 and FIG. 11, the rendering apparatus may further include:

a second calculation unit 76, configured to calculate, according to the normal line vector of each vertex on the surface of the 3D model, UV coordinate values of a highlighted map, where the highlighted map is a pre-generated texture color map; and a superimposition unit 77, configured to cover, according to the UV coordinate values of the highlighted map, the 3D model that has been covered with the gradient map with the highlighted map, and perform superimposition on a color value of the highlighted map and a color value of the gradient map.

Figure 12:
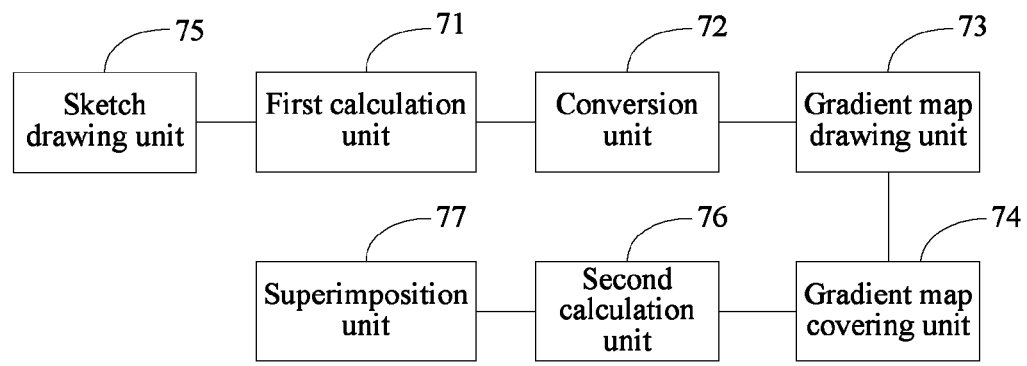
FIG. 12 is a structural block diagram of still another 3D model rendering apparatus disclosed by an embodiment of the present application.

FIG. 11 is expanded on the basis of FIG. 7. Referring to FIG. 12, the foregoing second calculation unit 76 and superimposition unit 77 may also be added on the basis of FIG. 8.

The 3D model in the foregoing embodiment may be a 3D cartoon character model. Hence, the 3D model rendering apparatus completes a 3D cartoon character rendering process.

The 3D model rendering apparatus disclosed by embodiments of the present application calculates, in a diffuse reflection illumination situation simulated by hardware, dot product operation results of a light vector and a normal line vector of each vertex on a surface of a 3D model, converts the dot product operation results of each vertex to corresponding UV coordinate values, then draws, according to a preset correspondence between UV coordinate values and a color value of a 3D model basic texture after receiving light, a gradient map having a color value corresponding to the UV coordinate values of the each vertex, and covers the surface of the 3D model with the gradient map, so as to complete rendering on the 3D model. The rendering apparatus provided by the present application uses dot product operation results of a light vector and a normal line vector of each vertex on the surface of the 3D model to draw a gradient map instead of performing vertex coloration in a conventional solution, transfers a conventional process of coloration in a three-dimensional model to drawing a gradient map in a two-dimensional plane and then, further covering the 3D model with the drawn gradient map, so as to achieve the same effect, and as compared with the existing technology, has a simpler processing process and also reduces a performance requirement on an electronic device in a process of performing 3D model rendering.

An embodiment of the present application further provides a terminal device, and the terminal device can perform a 3D model rendering process. The terminal device may be a mobile terminal such as a smart phone or a tablet computer and may also be a non-mobile terminal device such as a notebook computer. The terminal device may include the foregoing 3D model rendering apparatus, and reference may be made to the foregoing description of the corresponding part for description on the 3D model rendering apparatus, which is not repeated herein.

Figure 13:
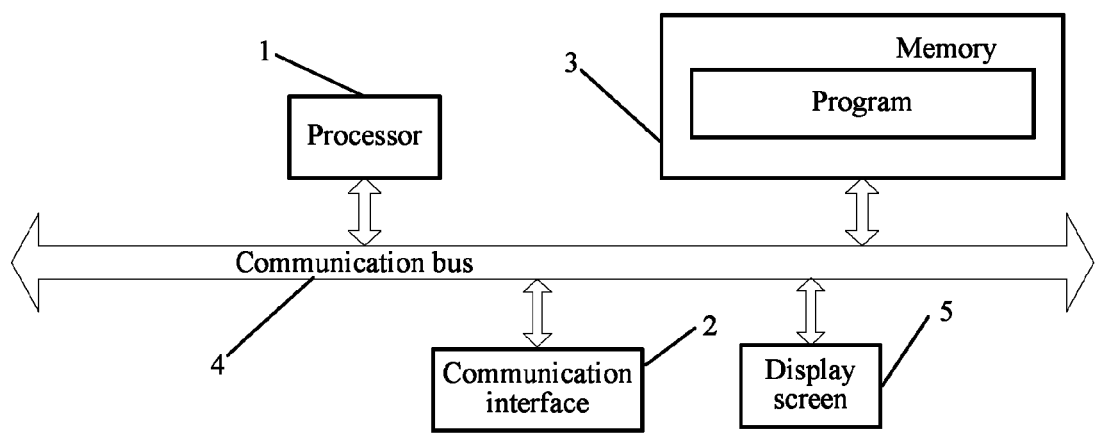
FIG. 13 is a structural block diagram of hardware of a terminal device disclosed by an embodiment of the present application.

A hardware structure of the terminal device according to an embodiment of the present application is described below, and for a part involving a 3D rendering method below, reference may be made to the foregoing description of the corresponding part. FIG. 13 is a structural block diagram of hardware of a terminal device according to an embodiment of the present application. Referring to FIG. 13, the terminal device may include:

a processor 1, a communication interface 2, a memory 3, a communication bus 4, and a display screen 5.

Communication among the processor 1, communication interface 2, memory 3, and display screen 5 is implemented through the communication bus 4.

Optionally, the communication interface 2 may be an interface of a communication module, for example, an interface of a GSM module.

The processor 1 is configured to execute a program.

The memory 3 is configured to store a program.

The program may include a program code, and the program code includes a operating instruction of the processor.

The processor 1 may be a Central Processing Unit (CPU) or an Application Specific Integrated Circuit (ASIC) or may be configured as one or more integrated circuits for implementing the embodiments of the present application.

The memory 3 may include a high-speed RAM memory, may also include a non-volatile memory, for example, at least one magnetic disk memory.

The program may be specifically used for:
calculating, in a diffuse reflection illumination situation simulated by hardware, dot product operation results of a light vector and a normal line vector of each vertex on a surface of a 3D model, the light vector corresponding to the diffuse reflection illumination, and converting the dot product operation results of each vertex to corresponding UV coordinate values;

drawing, according to a preset correspondence between UV coordinate values and a color value of a 3D model basic texture after receiving light, a gradient map having a color value corresponding to the UV coordinate values of the each vertex; and covering the surface of the 3D model with the gradient map.

It should be noted that the embodiments in this specification are all described in a progressive manner. Description of each of the embodiments focuses on differences from other embodiments, and reference may be made to each other for the same or similar parts among respective embodiments. The apparatus embodiments are substantially similar to the method embodiments and therefore are only briefly described, and reference may be made to the method embodiments for the associated part.

Persons skilled in the art may further realize that, in combination with the embodiments herein, units and algorithm, steps of each example described can be implemented with electronic hardware, computer software, or the combination thereof. In order to clearly describe the interchangeability between the hardware and the software, compositions and steps of each example have been generally described according to functions in the foregoing descriptions. Whether the functions are executed in a mode of hardware or software depends on particular applications and design constraint conditions of the technical solutions. Persons skilled in the art can use different methods to implement the described functions for each particular application, but it should not be considered that the implementation goes beyond the scope of the embodiments of the present disclosure.

In combination with the embodiments herein, steps of the method or algorithm described may be directly implemented using hardware, a software module executed by a processor, or the combination thereof. The software module may be placed in a random access memory (RAM), a memory, a read-only memory (ROM), an electrically programmable ROM (EPROM), an electrically erasable programmable ROM (EEPROM), a register, a hard disk, a removable magnetic disk, a CD-ROM, or any storage medium of other forms well-known in the technical field.

The above description of the disclosed embodiments enables persons skilled in the art to implement or use the present disclosure. Various modifications to these embodiments are obvious to persons skilled in the art, the general principles defined in the present disclosure may be implemented in other embodiments without departing from the spirit and scope of the present disclosure. Therefore, the present application is not limited to these embodiments illustrated in the present disclosure, but needs to conform to the broadest scope consistent with the principles and novel features disclosed in the present disclosure.

What is claimed is:

1. A 3D model rendering method comprising:
drawing a sketch of a 3D model;
calculating, in a diffuse reflection illumination situation simulated by hardware, dot product operation results of a light vector and a normal line vector of each vertex on a surface of a 3D model, the light vector corresponding to the diffuse reflection illumination, and converting the dot product operation results of each vertex to corresponding UV coordinate values;
drawing, according to a preset correspondence between UV coordinate values and a color value of a 3D model basic texture after receiving light, a gradient map having a color value corresponding to the UV coordinate values of the each vertex; and
covering the surface of the 3D model with the gradient map;
wherein the drawing a sketch of a 3D model comprises:
enlarging, according to a preset stroke line adjusting manner, the 3D model along a normal line direction of each vertex,
cropping a side face of a side that runs outward along a normal line of each triangular facet on the enlarged 3D model, and
coloring the cropped 3D model by using a preset stroke color.

2. The rendering method according to claim 1, wherein the preset stroke line adjusting manner is:
adjusting, according to a correspondence between a distance between the 3D model and a camera and a thickness of the stroke line, the thickness of the stroke line;
or,
setting a thickness of the stroke line to a set value.

3. The rendering method according to claim 1, wherein a value range of the UV coordinate values is from 0 to 1, and the converting each of the dot product operation results to the UV coordinate value of the vertex comprises:
setting a result value of the dot product operation result that is less than 0 to 0 and controlling a value range of the dot product operation result to fall within a range of 0 to 1; and
converting, according to the preset correspondence between the dot product operation results and the UV coordinate values, each of the dot product operation results to the UV coordinate value of the vertex.

4. The rendering method according to claim 1, further comprising:
calculating, according to the normal line vector of each vertex on the surface of the 3D model, UV coordinate values of a highlighted map, wherein the highlighted map is a pre-generated texture color map; and
covering, according to the UV coordinate values of the highlighted map, the 3D model that has been covered with the gradient map with the highlighted map, and performing superimposition on a color value of the highlighted map and a color value of the gradient map.

5. A 3D model rendering apparatus comprising:
one or more processors;
a memory; and
wherein the memory stores instructions that when executed by the one or more processors causes the one or more processors to:
draw a sketch of the 3D model;
calculate, in a diffuse reflection illumination situation, dot product operation results of a light vector and a normal line vector of each vertex on a surface of a 3D model, the light vector corresponding to the diffuse reflection illumination;
convert the dot product operation results of each vertex to corresponding UV coordinate values;
draw, according to a preset correspondence between UV coordinate values and a color value of a 3D model basic texture after receiving light, a gradient map having a color value corresponding to the UV coordinate values of the each vertex; and
cover the surface of the 3D model with the gradient map;
wherein the drawing a sketch of a 3D model comprises:
enlarging, according to a preset stroke line adjusting manner, the 3D model along a normal line direction of each vertex,
cropping a side face of a side that runs outward along a normal line of each triangular facet on the enlarged 3D model, and
coloring the cropped 3D model by using a preset stroke color.

6. The rendering apparatus according to claim 5, wherein the preset stroke line adjusting manner is:
adjusting, according to a correspondence between a distance between the 3D model and a camera and a thickness of the stroke line, the thickness of the stroke line;
or,
setting a thickness of the stroke line to a set value.

7. The rendering apparatus according to claim 5, wherein a value range of the UV coordinate values is from 0 to 1, and the instructions stored in the memory cause the one or more processors to:
set a result value of the dot product operation result that is less than 0 to 0 and control a value range of the dot product operation result to fall within a range of 0 to 1; and
search for a preset correspondence between the dot product operation results and the UV coordinate values and convert each of the dot product operation results to the UV coordinate value of the vertex.

8. The rendering apparatus according to claim 5, wherein the instructions stored in the memory further cause the one or more processors to:
calculate, according to the normal line vector of each vertex on the surface of the 3D model, UV coordinate values of a highlighted map, wherein the highlighted map is a pre-generated texture color map; and
cover, according to the UV coordinate values of the highlighted map, the 3D model that has been covered with the gradient map with the highlighted map, and perform superimposition on a color value of the highlighted map and a color value of the gradient map.

* * * * *